US012799015B2

(12) United States Patent
Inoue

(10) Patent No.: US 12,799,015 B2
(45) Date of Patent: Nov. 17, 2026

(54) OPTICAL FIBER BASE MATERIAL PRODUCTION METHOD

(71) Applicant: SUMITOMO ELECTRIC INDUSTRIES, LTD., Osaka (JP)

(72) Inventor: Ayumi Inoue, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 102 days.

(21) Appl. No.: 18/841,840

(22) PCT Filed: Dec. 27, 2022

(86) PCT No.: PCT/JP2022/048383
§ 371 (c)(1),
(2) Date: Aug. 27, 2024

(87) PCT Pub. No.: WO2023/166840
PCT Pub. Date: Sep. 7, 2023

(65) Prior Publication Data

US 2025/0162926 A1 May 22, 2025

(30) Foreign Application Priority Data

Mar. 1, 2022 (JP) ................................ 2022-031021

(51) Int. Cl.
*C03B 37/012* (2006.01)
*C03B 37/018* (2006.01)

(52) U.S. Cl.
CPC ...... *C03B 37/01222* (2013.01); *C03B 37/018* (2013.01)

(58) Field of Classification Search
None
See application file for complete search history.

(56) References Cited

U.S. PATENT DOCUMENTS

2013/0302001 A1* 11/2013 Aikawa .............. G02B 6/02214 65/397
2020/0012042 A1 1/2020 Arai et al.
2020/0369555 A1 11/2020 Amma et al.

FOREIGN PATENT DOCUMENTS

JP 2011168464 A 9/2011
JP 2016175779 A 10/2016
(Continued)

OTHER PUBLICATIONS

International Search Report issued in Patent Application No. PCT/JP2022/048383 dated Mar. 14, 2023.

*Primary Examiner* — Queenie S Dehghan
(74) *Attorney, Agent, or Firm* — McDonald Hopkins LLC

(57) ABSTRACT

An optical fiber preform production method is performed using a cladding material having a first end and a second end and being provided with a first hole, a first glass block having a first end and a second end and being provided with a second hole, and a first glass pipe including a first portion connected to the first end of the glass block. The method includes: connecting the first portion of the first glass pipe to the first end of the cladding material; after the connecting, introducing a gas into the first hole through the first glass pipe and the second hole, and gas phase processing an inner surface of the first hole; after the gas phase processing, inserting a core material from the second end of the cladding material into the first hole; and after the inserting, integrating the cladding material and the core material by heating.

8 Claims, 13 Drawing Sheets

(56) References Cited

FOREIGN PATENT DOCUMENTS

| | | | |
|---|---|---|---|
| JP | 2019031427 | A | 2/2019 |
| JP | 2021109812 | A | 8/2021 |
| WO | 2006075460 | A1 | 7/2006 |
| WO | 2018173774 | A1 | 9/2018 |

* cited by examiner

OPTICAL FIBER BASE MATERIAL PRODUCTION METHOD

TECHNICAL FIELD

The present disclosure relates to an optical fiber preform production method. The present application claims priority to Japanese Patent Application No. 2022-031021 filed on Mar. 1, 2022, the content of which is incorporated herein by reference in its entirety.

BACKGROUND ART

Patent Literature 1 discloses an optical fiber preform production method that includes a step of inserting a core material into a hole part provided in a cladding material, a step of inserting blocks into glass pipes connected to opposing ends of the cladding material to dispose and fix the core material between the blocks, and a step of integrating the core material and the cladding material by heating.

CITATION LIST

Patent Literature

[Patent Literature 1] Japanese Unexamined Patent Publication No. 2011-168464

Summary of Invention

Technical Problem

An optical fiber preform production method according to an aspect of the present disclosure is performed using a cladding material having a first end and a second end and being provided with a first hole, a first glass block having a first end and a second end and being provided with a second hole, and a first glass pipe including a first portion connected to the first end of the first glass block, the method including: connecting the first portion of the first glass pipe to the first end of the cladding material; after the connecting, introducing a gas into the first hole through the first glass pipe and the second hole, and gas phase processing an inner surface of the first hole; after the gas phase processing, inserting a core material from the second end of the cladding material into the first hole until a tip end of the core material abuts against the first glass block; and after the inserting, integrating the cladding material and the core material by heating.

DESCRIPTION OF EMBODIMENTS

Figure 1:
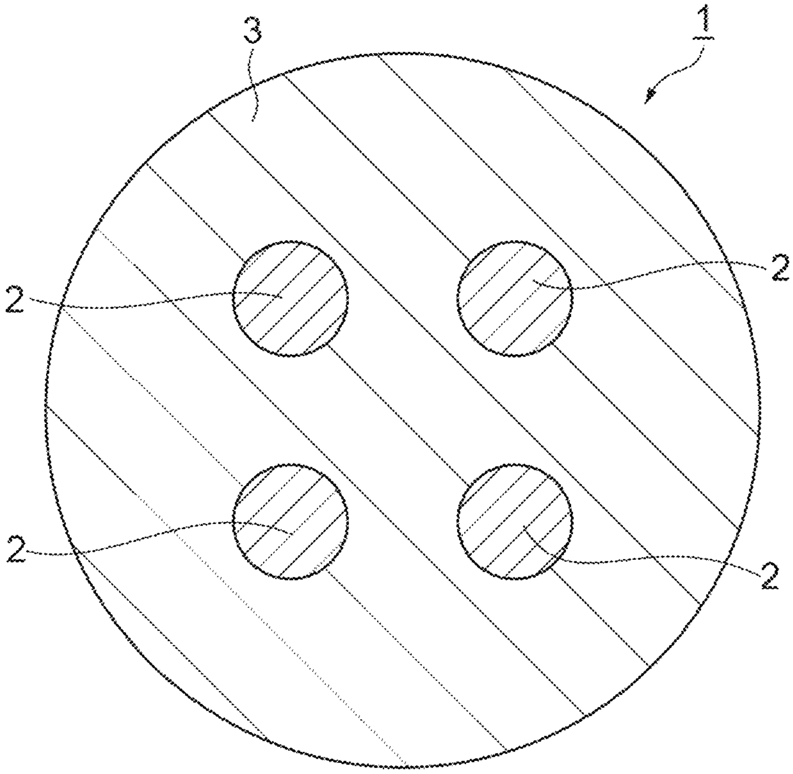
FIG. 1 is a cross-sectional view of an optical fiber preform according to an embodiment.

Problem to be Solved by the Present Disclosure

In the optical fiber preform production method above, there is a clearance between a block and a glass pipe, so that rotating a cladding material about an axial direction during the production causes the block made of glass to rotate inside the glass pipe. Glass chips are generated by the block being worn or chipped inside the glass pipe. The glass chips may be carried by a process gas and enter the interface between a core material and the cladding material to be a cause of reduction in the quality of the optical fiber.

It is an object of the present disclosure to provide an optical fiber preform production method that is capable of suppressing reduction in the quality of an optical fiber.

Advantageous Effects of the Present Disclosure

The present disclosure is capable of providing an optical fiber preform production method that is capable of suppressing reduction in the quality of an optical fiber.

Description of Embodiments of the Present Disclosure

Embodiments of the present disclosure will first be listed and described. An optical fiber preform production method according to an aspect of the present disclosure is performed using a cladding material having a first end and a second end and being provided with a first hole, a first glass block having a first end and a second end and being provided with a second hole, and a first glass pipe including a first portion connected to the first end of the first glass block, the method including: connecting the first portion of the first glass pipe to the first end of the cladding material; after the connecting, introducing a gas into the first hole through the first glass pipe and the second hole, and gas phase processing an inner surface of the first hole; after the gas phase processing, inserting a core material from the second end of the cladding material into the first hole until a tip end of the core material abuts against the first glass block; and after the inserting, integrating the cladding material and the core material by heating.

In the optical fiber preform production method above, the glass block is integrated to the first glass pipe, so that the first glass pipe and the glass block are in contact with each other, and the generation of glass chips is suppressed. This prevents glass chips from being carried by the gas and entering the first hole during the gas phase process. As a result, glass chips are prevented from entering the interface between the cladding material and the core material and reducing the quality of the optical fiber.

The first glass pipe may further include a second portion connected to the second end of the first glass block. In this case, the flow of gas is facilitated in the gas phase process since the first glass block and the cladding material are not directly connected together.

The cladding material may be provided with a plurality of the first holes. In this case, the effect of facilitating the flow of gas in the gas phase process is pronounced.

The core material may include a main body part to be inserted into the first hole, and a dummy part connected to the main body part, and to be inserted into the first portion of the first glass pipe. In this case, the dummy part is an ineffective part that does not become a Core portion, so that, for example, using waste material for the dummy part enables efficient use of materials.

In the connecting, the first glass pipe may be connected such that at least a portion of the first hole does not overlap the second hole when viewed in an axial direction of the cladding material. In this case, a configuration in which the core material abuts against the first glass block can be achieved.

A hole size of the first hole may be greater than a hole size of the second hole. In this case, the configuration in which the core material abuts against the first glass block can be easily achieved.

The optical fiber preform production method above may further include: before the gas phase processing, connecting a second glass pipe to a second end of the cladding material; and after the inserting and before the integrating, inserting a second glass block inside the second glass pipe, and fixing the second glass block to a position abutting against a rear end of the core material. In this case, both ends of the core material can be fixed, so that positional misalignment of the core material is suppressed.

The fixing may be performed using a tubular glass jig disposed inside the second glass pipe and provided with a third hole, and a glass rod inserted through the third hole. In this case, the glass jig can suppress vibration of the glass rod inside the second glass pipe.

Details of Embodiments of the Present Disclosure

Specific examples of the optical fiber preform production method of the present disclosure will be described below with reference to the drawings. It should be noted that the present invention is not limited to these examples, but is defined by the scope of the claims, and is intended to include all modifications within the meaning and scope equivalent to the scope of the claims. Same reference signs are given to the same elements in the description of the drawings, and redundant description will be omitted.

FIG. 1 is a cross-sectional view of an optical fiber preform according to an embodiment. This figure illustrates a cross-section perpendicular to a central axis of an optical fiber preform 1. The optical fiber preform 1 is a multicore optical fiber preform that includes a plurality of Core portions 2 and a common Cladding portion 3. In this embodiment, there are four Core portions 2.

The plurality of Core portions 2 extend along the central axis of the optical fiber preform 1. The plurality of Core portions 2 are disposed at positions that are rotationally symmetric with respect to the central axis in a cross-section orthogonal to the central axis. The plurality of Core portions 2 have the same circular cross-sectional shape. Each Core portion 2 has a diameter of, for example, from 6 μm to 12 μm. The Cladding portion 3 surrounds the plurality of Core portions 2. The Cladding portion 3 has a diameter of, for example, from 124 μm to 126 μm.

A refractive index of the Core portion 2 is higher than a refractive index of the Cladding portion 3. The Core portion 2 and the Cladding portion 3 are made of a silica-based glass material. The Core portion 2 and the Cladding portion 3 include silica glass as the main component, and include a dopant for adjusting the refractive index.

Figure 2:
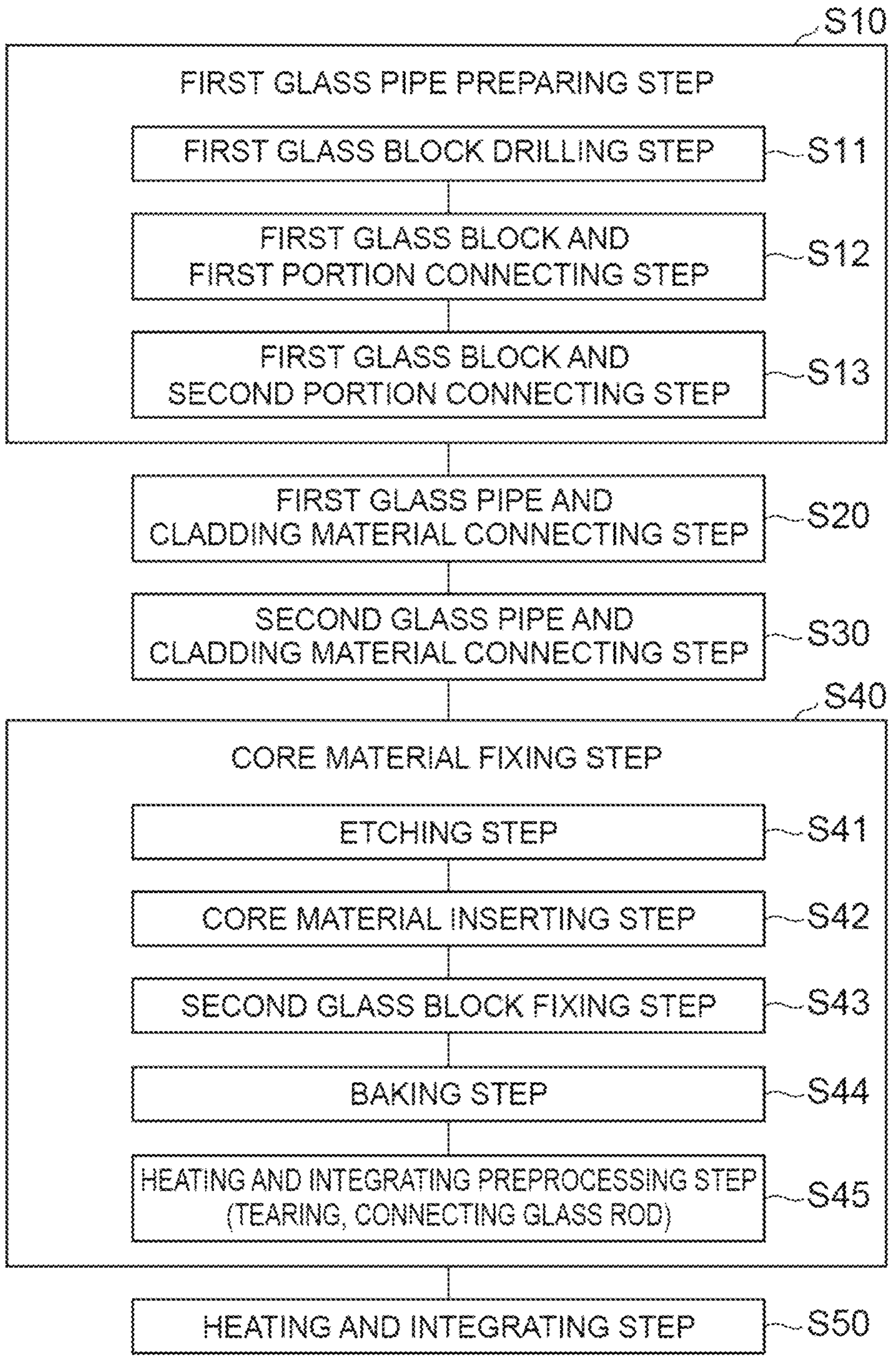
FIG. 2 is a flow chart illustrating an optical fiber preform production method according to an embodiment.

FIG. 2 is a flow chart illustrating an optical fiber preform production method according to an embodiment. As illustrated in FIG. 2, the method for producing the optical fiber preform 1 includes a step S10 of preparing a first glass pipe 10 (see FIG. 3), a step S20 of connecting the first glass pipe 10 and a cladding material 30 (see FIG. 5) together, a step S30 of connecting a second glass pipe 20 (see FIG. 5) and the cladding material 30 together, a step S40 of fixing a core material 40 (see FIG. 7), and a step S50 of integrating the core material 40 and the cladding material 30 by heating. In this production method, the optical fiber preform 1 is produced by the step S10 to the step S50 being performed in that order. However, the step S20 may be performed after the step S30, or simultaneously with the step S30.

Figure 3:
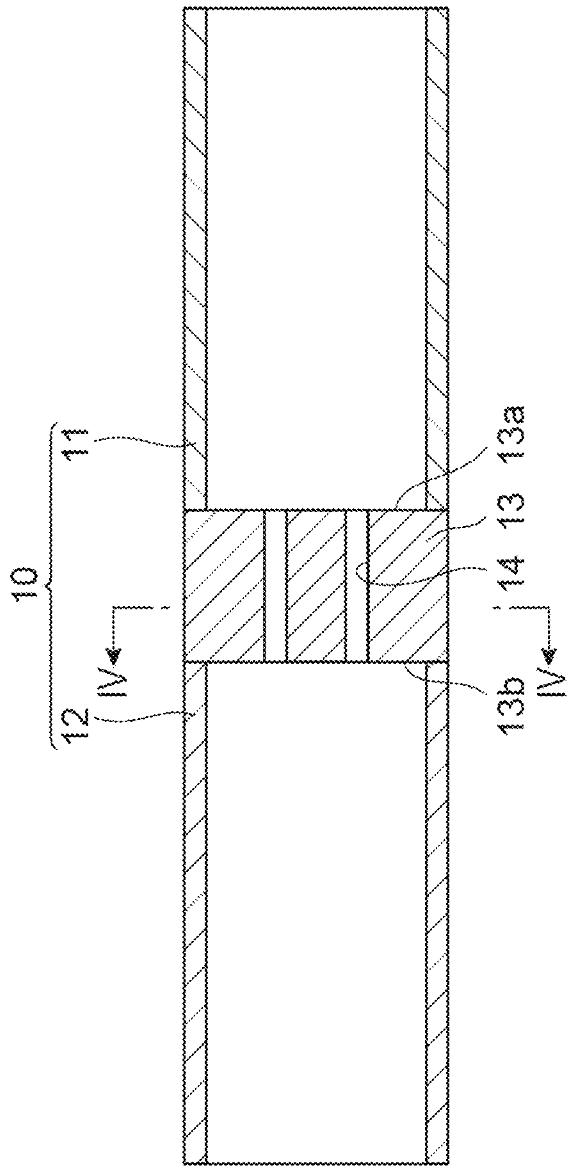
FIG. 3 is a cross-sectional view including a central axis of a first glass pipe for describing a step of preparing the first glass pipe.

FIG. 3 is a cross-sectional view including the central axis of the first glass pipe 10 for describing the step S10 of preparing the first glass pipe 10. In the step S10, the first glass pipe 10 to which a first glass block 13 is integrated is prepared as illustrated in FIG. 3. The first glass pipe 10 includes a first portion 11 and a second portion 12. The first portion 11 is connected to a first end 13*a* of the first glass block 13. The second portion 12 is connected to a second end 13*b* of the first glass block 13. The first portion 11 and the second portion 12 are glass pipes having a circular cross-sectional shape. The first portion 11 and the second portion 12 have the same outer diameter and the same inner diameter.

Figure 4:
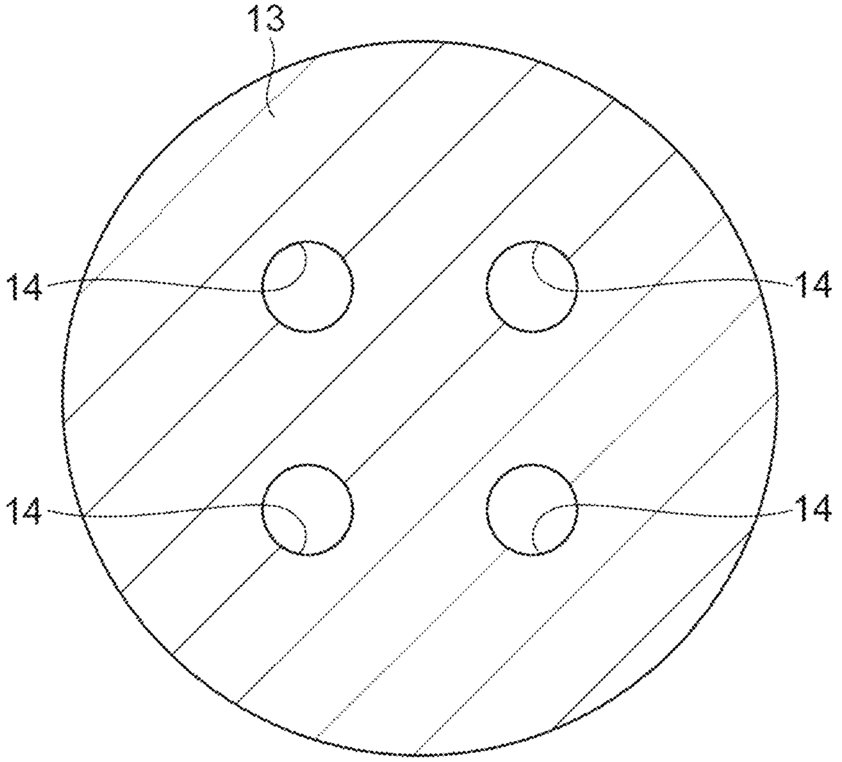
FIG. 4 is a cross-sectional view taken along line IV-IV in FIG. 3.

FIG. 4 is a cross-sectional view taken along line IV-IV in FIG. 3. As illustrated in FIGS. 3 and 4, the first glass block 13 is a cylindrical member provided with one or a plurality of holes 14. The holes 14 extend along an axial direction of the first glass block 13. The holes 14 have a circular cross-sectional shape. In this embodiment, there are four holes 14. The position and hole size (diameter) of the holes 14 are arbitrary. An outer diameter of the first glass block 13 is equal to an outer diameter of the first portion 11 and the second portion 12. The first glass block 13 is disposed between the first portion 11 and the second portion 12 to be coaxial with the first portion 11 and the second portion 12. The first glass block 13 is integrated with the first portion 11 and the second portion 12.

The step S10 includes a step S11 of drilling the holes 14 in the first glass block 13, a step S12 of connecting the first glass block 13 and the first portion 11 together, and a step S13 of connecting the first glass block 13 and the second portion 12 together. In the step S10, the first glass pipe 10 to which the first glass block 13 is integrated is prepared by the step S11 to the step S13 being performed in that order. However, the step S12 may be performed after the step S13, or simultaneously with the step S13.

In the step S11, one or a plurality of the holes 14 are formed in the cylindrical first glass block 13, for example, by a drill. In the step S12, a glass pipe to be the first portion 11 is melted and connected to the first end 13*a* of the first glass block 13. In the step S13, a glass pipe to be the second portion 12 is melted and connected to the second end 13*b* of the first glass block 13.

Figure 5:
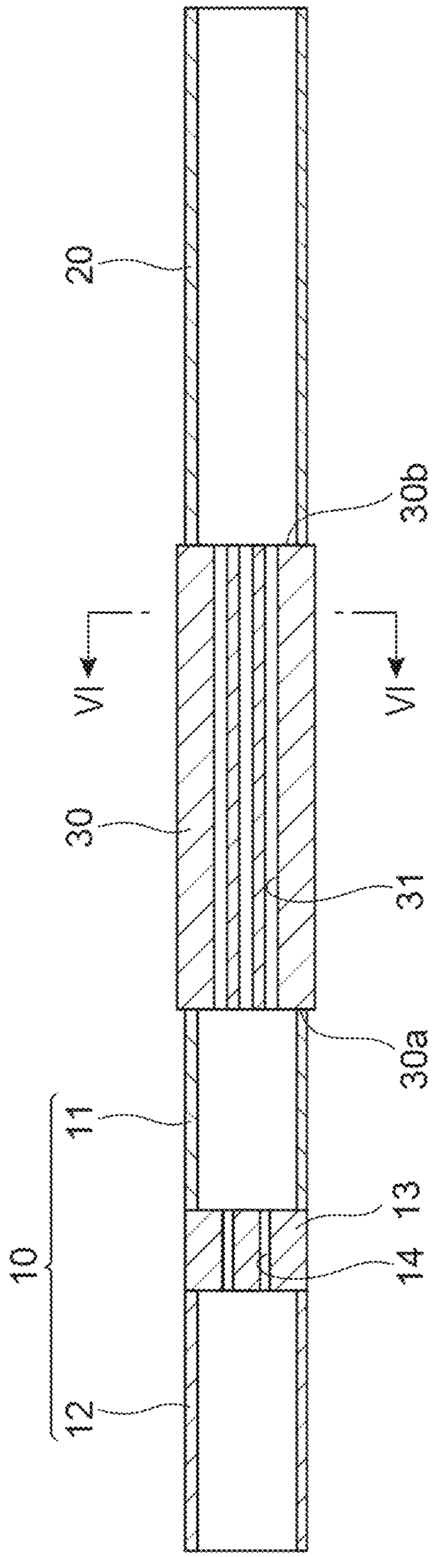
FIG. 5 is a cross-sectional view including a central axis of a cladding material to which the first glass pipe and a second glass pipe are connected.

FIG. 5 is a cross-sectional view including a central axis of the cladding material 30 to which the first glass pipe 10 and the second glass pipe 20 are connected. In the step S20, the first portion 11 of the first glass pipe 10 to which the first glass block 13 is integrated is melted and connected to a first end 30*a* of the cladding material 30 as illustrated in FIG. 5.

The first portion 11 of the first glass pipe 10 is melted and connected to the first end 30*a* so as to surround a plurality of holes 31 when viewed in an axial direction of the cladding material 30. The first portion 11 is connected to the first end 30*a* to be coaxial with the cladding material 30. The first portion 11 is coaxial with the first glass block 13 and the second portion 12, so that the cladding material 30 is coaxial with the entire first glass pipe 10 as well as with the first glass block 13.

Figure 6:
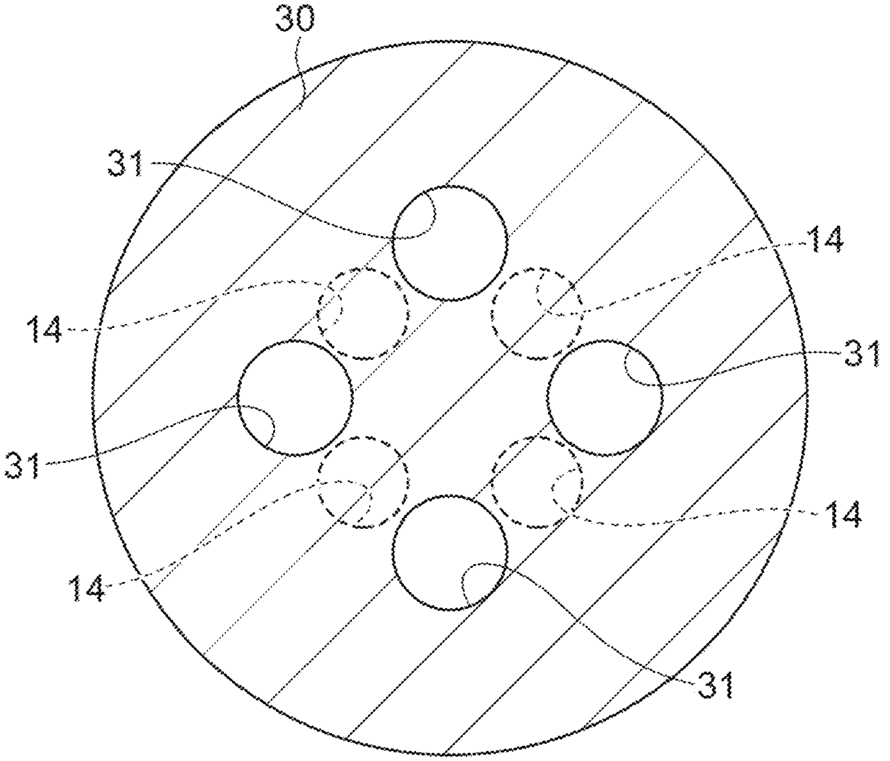
FIG. 6 is a cross-sectional view taken along line VI-VI in FIG. 5.

FIG. 6 is a cross-sectional view taken along line VI-VI in FIG. 5. As illustrated in FIGS. 5 and 6, the cladding material 30 is a cylindrical member provided with the plurality of holes 31. The cladding material 30 is made by forming the plurality of holes 31 in a cylindrical glass member, for example, by a drill. The plurality of holes 31 extend along the axial direction of the cladding material 30. The holes 31 have a circular cross-sectional shape. A hole size (diameter) of the holes 31 is greater than the hole size of the holes 14. In this embodiment, there are four holes 31. The cladding material 30 is a member to be the Cladding portion 3 (see FIG. 1), and has a shape corresponding to the Cladding portion 3. Although in this embodiment, an outer diameter of the cladding material 30 is greater than an outer diameter of the first portion 11 of the first glass pipe 10, they may be equal.

In the step S20, the first glass pipe 10 is connected such that at least a portion of each of the holes 31 does not overlap the holes 14 when viewed in the axial direction of the cladding material 30. If the entirety of each of the holes 31 is disposed inside the holes 14 when viewed in the axial direction of the cladding material 30, the core material 40 may enter the holes 14 in the steps described further below. Hence, the first glass pipe 10 is connected such that the entirety of each of the holes 31 is not disposed inside the holes 14. In this embodiment, the entirety of each of the holes 31 does not overlap the holes 14 when viewed in the axial direction of the cladding material 30. That is, the holes 14 and the holes 31 do not overlap each other, but are separated.

In the step S30, the second glass pipe 20 is melted and connected to a second end 30*b* of the cladding material 30. The second glass pipe 20 is a glass pipe having a circular cross-sectional shape as illustrated in FIG. 5. The second glass pipe 20 has a tubular shape. The second glass pipe 20 has the same outer diameter and the same inner diameter as the first portion 11 and the second portion 12 of the first glass pipe 10. The second glass pipe 20 is melted and connected to the second end 30*b* so as to surround the plurality of holes 31 when viewed in the axial direction of the cladding material 30. That is, the second glass pipe 20 is connected to the second end 30*b* so as to surround the plurality of holes 31 when viewed in the axial direction. The second glass pipe 20 is connected to the second end 30*b* to be coaxial with the cladding material 30.

The step S40 includes a step S41 of performing an etching process, a step S42 of inserting the core material 40, a step S43 of fixing a second glass block 50 (see FIG. 9), a step S44 of performing a baking process, and a step S45 of performing preprocessing for the heating and tearing step S50. In the step S40, the core material 40 is fixed to the cladding material 30 by the step S41 to the step S43 being performed in that order.

In the step S41, a gas is introduced into the holes 31 of the cladding material 30 through the first glass pipe 10 and the holes 14 of the first glass block 13 to etch (gas phase processing) inner surfaces of the holes 31. The etching process is performed, for example, while rotating the cladding material 30 about the axial direction and heating an outer peripheral surface of the cladding material 30 by an external heat source. The etching process removes impurities on the inner surfaces of the holes 31, and smooths the inner surfaces of the holes 31.

The gas introduced into the holes 31 is, for example, an etching gas such as $SF_6$. The gas is supplied from the second portion 12 of the first glass pipe 10, flows through the second portion 12, the holes 14 of the first glass block 13, and the first portion 11 in order, and is introduced into the holes 31 of the cladding material 30. After flowing through the holes 31, the gas is discharged via the second glass pipe 20. The first glass pipe 10 side is an upstream side of the gas, and the second glass pipe 20 side is a downstream side of the gas with respect to the holes 31.

A joint (not shown) for connecting the second portion 12 to a supply system of the gas is attached to an end part of the second portion 12. A joint 63 (see FIG. 9) for connecting the second glass pipe 20 to a discharge system of the gas is attached to an end part of the second glass pipe 20. The etching process is performed with the second portion 12 and the second glass pipe 20 being rotatably held by a holding part of a glass lathe (not shown). The holding part holds the second portion 12 and the second glass pipe 20, and not the cladding material 30 that is to be heated by an external heat source, so that thermal effects on the holding part can be suppressed.

Figure 7:
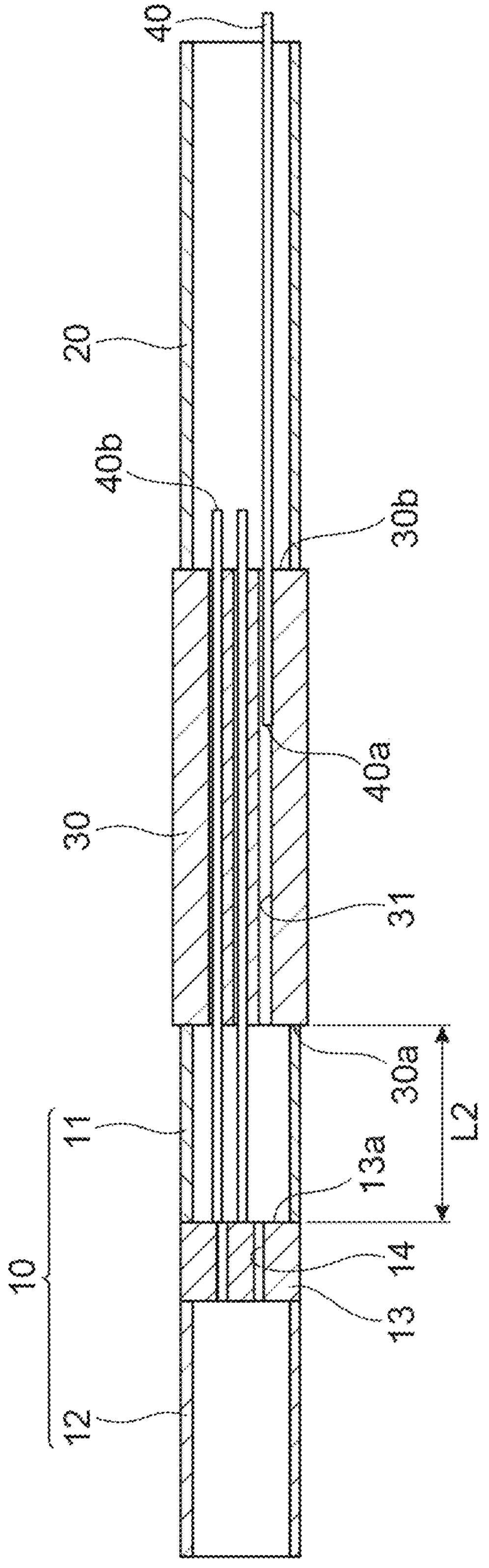
FIG. 7 is a cross-sectional view including the central axis of the cladding material to which the first glass pipe and the second glass pipe are connected for describing a step of inserting a core material.

FIG. 7 is a cross-sectional view including the central axis of the cladding material 30 to which the first glass pipe 10 and the second glass pipe 20 are connected for describing the step S42 of inserting the core material 40. In the step S42, a plurality of the core materials 40 are inserted one by one into the plurality of holes 31 of the cladding material 30 as illustrated in FIG. 7. The plurality of the core materials 40 are set to have the same length. An outer diameter of the core materials 40 is slightly smaller than the hole size of the holes 31, and greater than the hole size of the holes 14. The core materials 40 are passed through the second glass pipe 20 and inserted into the holes 31 from the second end 30*b* (downstream side of the gas) of the cladding material 30. The core materials 40 are inserted until tip ends 40*a* thereof abut against the first end 13*a* of the first glass block 13.

Figure 8:
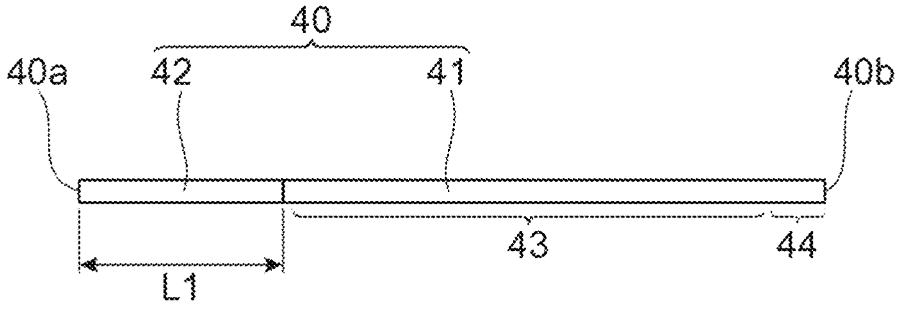
FIG. 8 is a plan view illustrating the core material.

FIG. 8 is a plan view illustrating the core material 40. As illustrated in FIG. 8, the core material 40 has a main body part 41 that is inserted into the hole 31 and the second glass pipe 20, and a dummy part 42 (dummy glass material) that protrudes from the hole 31 and is inserted into the first portion 11 of the first glass pipe 10. The main body part 41 includes a first portion 43 that is inserted into the hole 31, and a second portion 44 that is inserted into the second glass pipe 20. The first portion 43 is an effective part to be the Core portion 2. The second portion 44 includes a rear end

40*b* of the core material 40. The second portion 44 and the dummy part 42 are ineffective parts that do not become the Core portion 2.

The dummy part 42 includes the tip end 40*a*, and is connected to the first portion 43 of the main body part 41. The main body part 41 and the dummy part 42 are melted and connected to be coaxial with each other. A length L1 of the dummy part 42 in the axial direction is set according to a length L2 of the first portion 11 of the first glass pipe 10 in the axial direction. The length L1 is set, for example, to be equal to the length L2. When the step S42 is completed, the first portion 43 is disposed inside the hole 31. The second portion 44 of the main body part 41 is disposed inside the second glass pipe 20. The dummy part 42 is disposed inside the first portion 11. The main body part 41 is required to have the same composition as the Core portion 2 since it includes the effective part, but the dummy part 42 may have a different composition from the Core portion 2 since it is formed only of the ineffective part.

Figure 9:
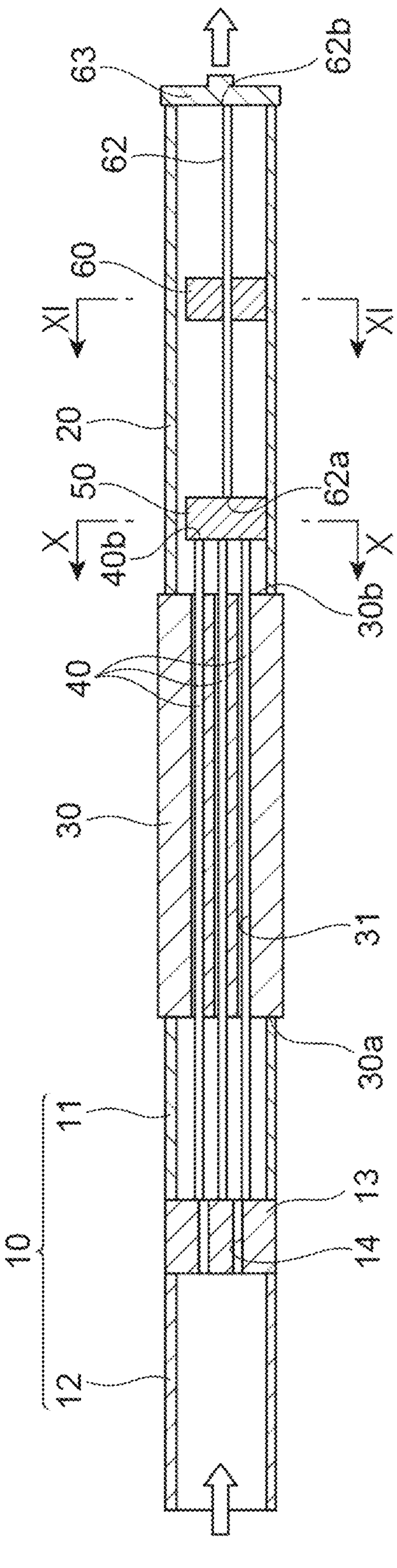
FIG. 9 is a cross-sectional view including the central axis of the cladding material to which the first glass pipe and the second glass pipe are connected for describing a step of fixing a second glass block and a step of performing a baking process.
Figure 10:
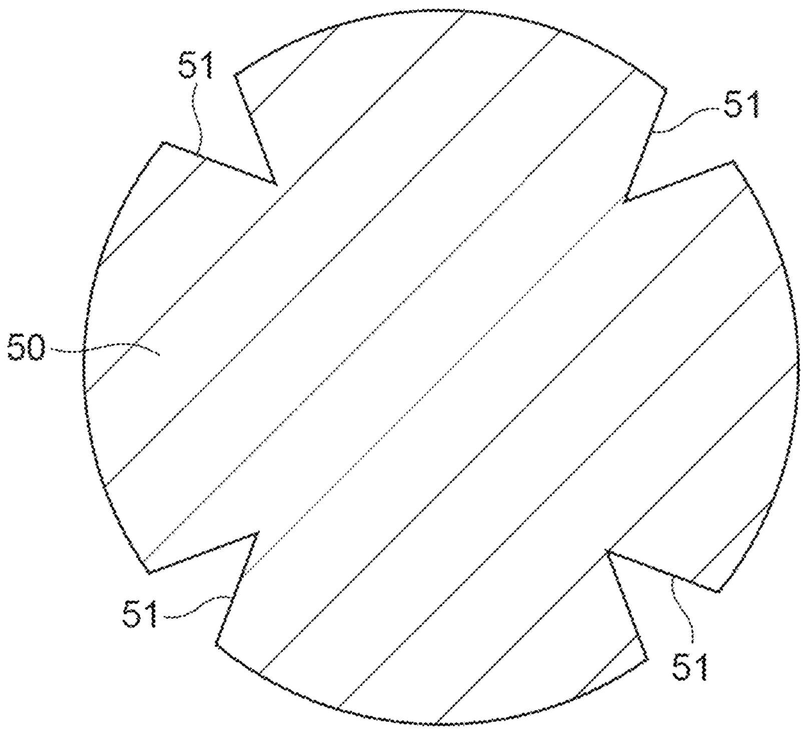
FIG. 10 is a cross-sectional view taken along line X-X in FIG. 9.
Figure 11:
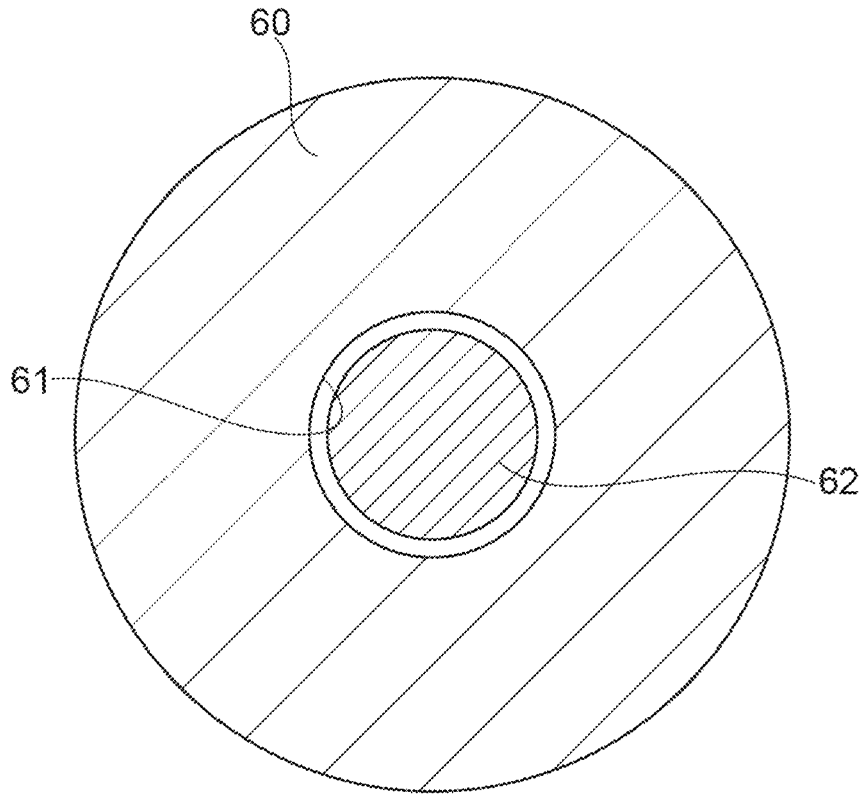
FIG. 11 is a cross-sectional view taken along line XI-XI in FIG. 9.

FIG. 9 is a cross-sectional view including the central axis of the cladding material 30 to which the first glass pipe 10 and the second glass pipe 20 are connected for describing the step S43 of fixing the second glass block 50 and the step S44 of performing the baking process. FIG. 10 is a cross-sectional view taken along line X-X in FIG. 9. FIG. 11 is a cross-sectional view taken along line XI-XI in FIG. 9. In the step S43, the second glass block 50 is inserted inside the second glass pipe 20, and fixed to a position abutting against the rear end 40*b* of the core material 40 as illustrated in FIG. 9. The step S43 is performed using a glass jig 60 and a glass rod 62.

As illustrated in FIGS. 9 and 10, the second glass block 50 is a cylindrical member provided with one or a plurality of grooves 51 in an outer peripheral surface. The grooves 51 extend along an axial direction of the second glass block 50. The grooves 51 have a V-shaped cross-section. The grooves 51 form gaps between an inner surface of the second glass pipe 20 to be flow paths of gas. The grooves 51 smooth the flow of gas. In this embodiment, there are four grooves 51. A diameter of the second glass block 50 is smaller than a diameter of the second glass pipe 20.

As illustrated in FIGS. 9 and 11, the glass jig 60 is a tubular member that is provided with a hole 61 in the center for inserting the glass rod 62 therethrough. The hole 61 extends along an axial direction of the glass jig 60. The hole 61 has a circular cross-sectional shape. The diameter of the second glass block 50 is smaller than the diameter of the second glass pipe 20. The glass rod 62 has a circular cross-sectional shape. A diameter of the glass rod 62 is smaller than a hole size (diameter) of the hole 61.

In the step S43, for example, the second glass block 50 is first inserted inside the second glass pipe 20, and is pushed into the position abutting against the rear end 40*b* of the core material 40. The glass jig 60 and the glass rod 62 are then inserted inside the second glass pipe 20. The glass jig 60 is inserted to a substantially central position of the second glass pipe 20 in the axial direction. The glass rod 62 is inserted through the hole 61 in advance, and is then inserted inside the second glass pipe 20 together with the glass jig 60 with the glass jig 60 mounted thereto. The glass rod 62 is disposed such that a tip end 62*a* thereof abuts against the second glass block 50. That is, the second glass block 50 is pressed by the glass rod 62 with the glass jig 60 mounted thereto.

Finally, the joint 63 is attached to the end part of the second glass pipe 20. The joint 63 is made, for example, of a heat-resistant resin such as Teflon (registered trade mark), and covers the end part of the second glass pipe 20. The joint 63 abuts against a rear end 62*b* of the glass rod 62, and suppresses the movement of the glass rod 62 in the axial direction. This also suppresses the movement of the second glass block 50 in the axial direction. That is, the second glass block 50 is fixed to the position abutting against the rear end 40*b* of the core material 40. Consequently, the core material 40 is fixed between the first glass block 13 and the second glass block 50. It is required that the lengths of the core materials 40 are equal to one another to securely fix all the core materials 40.

In the step S44, a gas is introduced into the holes 31 of the cladding material 30 through the first glass pipe 10 and the holes 14 of the first glass block 13 to bake (gas phase processing) the inner surfaces of the holes 31. Similarly to the etching process, the baking process is performed, for example, while rotating the cladding material 30 about the axial direction and heating the outer peripheral surface of the cladding material 30 by an external heat source. The baking process is performed with the second portion 12 of the first glass pipe 10 and the second glass pipe 20 being rotatably held by the holding part of the glass lathe (not shown).

The baking process removes impurities on the inner surfaces of the holes 31, and smooths the inner surfaces of the holes 31. The gas introduced into the holes 31 is, for example, a cleaning gas (i.e., baking gas) such as chlorine or oxygen. The gas is supplied from the second portion 12 of the first glass pipe 10, flows through the second portion 12, the holes 14 of the first glass block 13, and the first portion 11 in order, and is introduced into the holes 31 of the cladding material 30. After flowing through the holes 31, the gas is discharged via the second glass pipe 20.

Figure 12:
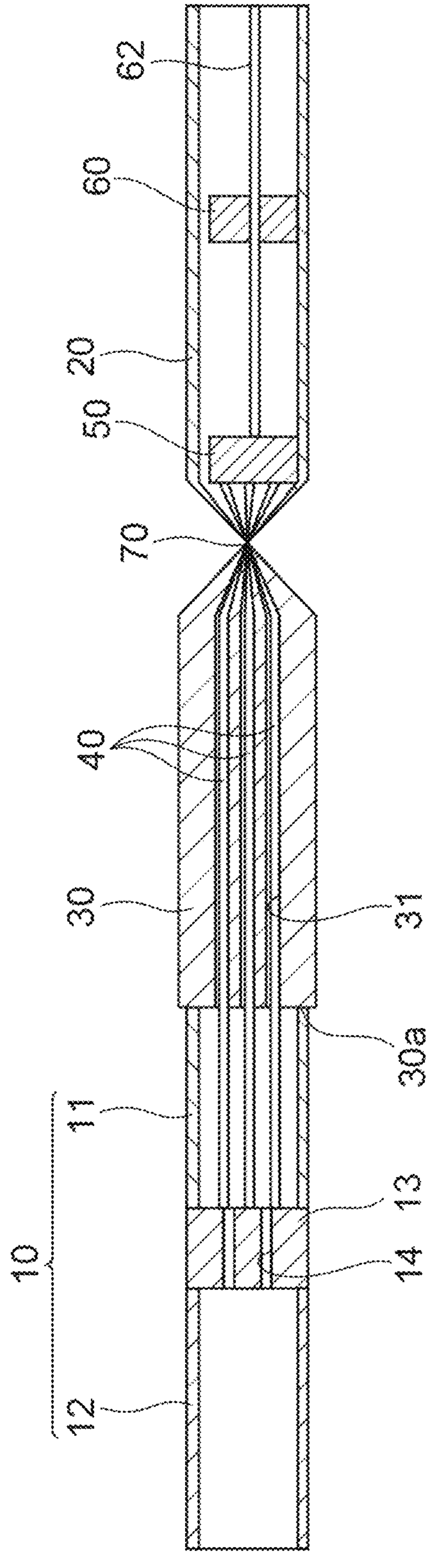
FIG. 12 is a cross-sectional view including the central axis of the cladding material to which the first glass pipe is connected for describing a step of performing preprocessing.
Figure 13:
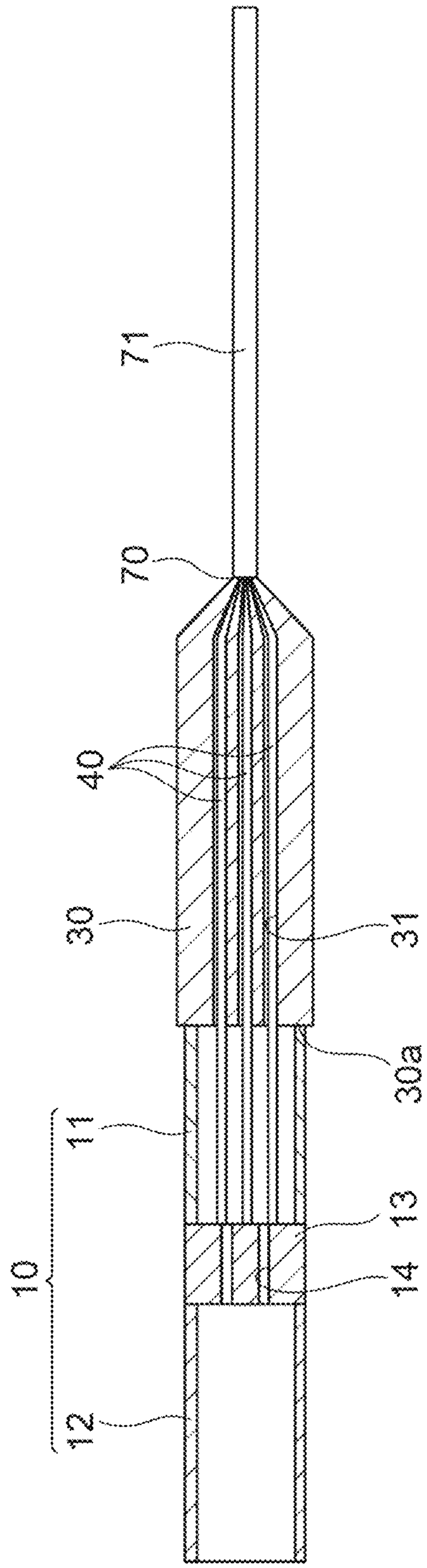
FIG. 13 is a cross-sectional view including the central axis of the cladding material to which the first glass pipe and a glass rod are connected for describing a step of performing preprocessing.

FIGS. 12 and 13 are cross-sectional views including the central axis of the cladding material 30 to which the first glass pipe 10 is connected for describing a step of performing preprocessing for the heating and integrating process. In the step S45, a connecting part between the cladding material 30 and the second glass pipe 20 is torn while being heated by an external heat source (not shown) with the core materials 40 fixed as illustrated in FIG. 12. This forms a tearing part 70 having a tapered shape. The cladding material 30 and the core materials 40 are integrated at the tearing part 70. Hence, the fixing of the core materials 40 is not released by the tearing.

The tearing part 70 also functions as a sealing part for sealing one ends of the holes 31. The heating and integrating process is performed while drawing a vacuum inside the holes 31 from the first glass pipe 10 side. It is thus necessary to seal the holes 31 on the second glass pipe 20 side as a preprocess for the heating and integrating process. A glass rod 71 is then melted and connected to the tearing part 70 as illustrated in FIG. 13. The glass rod 71 is connected to be coaxial with the cladding material 30.

In the step S50, the cladding material 30 and the core materials 40 are integrated by heating while drawing a vacuum inside the holes 31 from the first glass pipe 10 side. Similarly to the etching process and the baking process, the heating and integrating process is performed, for example, while rotating the cladding material 30 about the axial direction and heating the outer peripheral surface of the cladding material 30 by an external heat source. The heating and integrating process is performed with the second portion 12 of the first glass pipe 10 and the glass rod 71 being rotatably held by the holding part of the glass lathe (not shown). Since the positions of the core materials 40 in the axial direction are fixed, the core materials 40 can be heated and integrated with the cladding material 30 simultaneously while being prevented from stretching and thinning by the heating.

As described above, in the method for producing the optical fiber preform 1 according to the embodiment, the first glass block 13 is integrated to the first glass pipe 10, so that the first glass pipe 10 and the first glass block 13 are in contact with each other, and the generation of glass chips is suppressed. This prevents glass chips from being carried by the gas and entering the holes 31 in the etching process of the step S41 and the baking process of the step S44. As a result, glass chips are prevented from entering the interface between the cladding material 30 and the core materials 40 and reducing the quality of the optical fiber.

The second glass block 50 is not integrated to the second glass pipe 20. This is because the first glass pipe 10 side is the upstream side of the gas, and the second glass pipe 20 side is the downstream side of the gas with respect to the holes 31. Even if the second glass pipe 20 and the second glass block 50 come into contact with each other and glass chips are generated, the glass chips will be carried to the downstream side of the gas. Consequently, the glass chips will be prevented from entering the holes 31.

The first glass pipe 10 includes the first portion 11 that is connected to the first end 30*a* of the cladding material 30. The first portion 11 is disposed between the first glass block 13 and the cladding material 30, so that the first glass block 13 and the cladding material 30 are not directly connected together. This facilitates the flow of gas during the etching process of the step S41 and the baking process of the step S44. The smooth flow of gas enables the inner surfaces of the holes 31 to be evenly etched.

In the step S20, it is only required that the first portion 11 and the cladding material 30 are connected together, so that the melting and connecting is facilitated compared to a case in which the first glass block 13 and the cladding material 30 are directly connected together.

In the production method disclosed in Patent Literature 1, the glass block is fixed by heating and reducing the diameter of a portion of the glass pipe, so that it is necessary to cut off the heated and diameter-reduced portion each time to reuse the glass pipe. This tends to increase the consumption of glass pipes. Furthermore, the glass block cannot be reused in a case in which the glass pipe is heated and the diameter is reduced at a position where the glass block is disposed. However, in the present embodiment, the first glass block 13 can be fixed without reducing the diameter of the first glass pipe 10. Consequently, cutting off only the end part of the first portion 11 connected to the cladding material 30 after the heating and integrating process of the step S50 enables the remainder of first glass pipe 10 and the first glass block 13 to be reused.

The core material 40 has the dummy part 42. The dummy part 42 is an ineffective part that does not become the Core portion 2, so that using waste material for the dummy part 42 enables efficient use of materials.

In the step S20, the cladding material 30 and the first glass pipe 10 are connected together such that at least a portion of the hole 31 does not overlap the hole 14 when viewed in the axial direction of the cladding material 30. This prevents the core material 40 from entering the hole 14, and makes it possible to achieve the configuration in which the core material 40 abuts against the first glass block 13.

The hole size of the hole 31 is greater than the hole size of the hole 14, so that at least a portion of the hole 31 does not overlap the hole 14 when viewed in the axial direction of the cladding material 30. The outer diameter of the core material 40 is only slightly smaller than the hole size of the hole 31, which further prevents the core material 40 from entering the hole 14, and makes it possible to easily achieve the configuration in which the core material 40 abuts against the first glass block 13. The hole size of the hole 14 is smaller than the outer diameter of the core material 40, which reliably prevents the core material 40 from entering the hole 14. This eliminates the need to adjust the connection angle (angle about the axial direction) between the cladding material 30 and the first glass pipe 10 in the step S20.

The tip end 40*a* of the core material 40 is fixed by the first glass block 13, and the rear end 40*b* of the core material 40 is fixed by the second glass block 50 in the step S43. Both ends of the core material 40 can thus be fixed, so that positional misalignment of the core material 40 in the axial direction is suppressed. The fixing of the core material 40 is also maintained during the tearing in the step S45.

The second glass block 50 is fixed to the position abutting against the rear end 40*b* of the core material 40 by the glass rod 62. Unlike the production method disclosed in Patent Literature 1, in the present embodiment, the second glass block 50 can be fixed without heating and reducing the diameter of the second glass pipe 20. Consequently, cutting off just the end part of the second glass block 50 after the tearing in the step S45 enables the remainder of the second glass pipe 20 and the second glass block 50 to be reused.

The step S43 is performed using not only the glass rod 62 that presses the second glass block 50, but also the glass jig 60 through which the glass rod 62 is inserted. The glass jig 60 suppresses the movement of the glass rod 62 in a direction orthogonal to the axial direction. In particular, the cladding material 30 is rotated about the axial direction during the baking process of the step S44 and the heating and integrating process of the step S50, so that the glass rod 62 tends to vibrate inside the second glass pipe 20. The glass jig 60 suppresses the vibration of the glass rod 62 inside the second glass pipe 20. This suppresses damages to the second glass pipe 20 by the vibrating glass rod 62.

Although the embodiments have been described, the present disclosure is not necessarily limited to the embodiments and variations described above, and various modifications are possible without departing from the gist thereof.

Although the optical fiber preform 1 produced by the production method according to the embodiment above is a multicore optical fiber preform, it may be a single core optical fiber preform. In this case, one hole 31 is provided in the cladding material 30.

The entirety of the core material 40 may be formed of the main body part 41 without the core material 40 including the dummy part 42.

The hole size of the holes 31 may be equal to or smaller than the hole size of the holes 14. In this case, the connection angle between the cladding material 30 and the first glass pipe 10 is adjusted in the step S20 such that at least a portion of each of the holes 31 does not overlap the holes 14 when viewed in the axial direction of the cladding material 30.

The embodiments and variations above may be combined as appropriate.

As is understood from the description of the embodiments and variations above, the present specification includes the disclosure of the aspects shown below.

APPENDIX 1

An optical fiber preform production method including:

connecting a first glass pipe to which a first glass block provided with a second hole is integrated to a first end of a cladding material provided with a first hole;

after the connecting, introducing a gas into the first hole through the first glass pipe and the second hole, and gas phase processing an inner surface of the first hole;

after the gas phase processing, inserting a core material from a second end side of the cladding material into the first hole until a tip end of the core material abuts against the first glass block; and after the inserting, integrating the cladding material and the core material by heating.

APPENDIX 2

An optical fiber preform production method including:

connecting a first glass pipe to a cladding material, using the cladding material having a first end and a second end and being provided with a first hole, a first glass block having a first end and a second end and being provided with a second hole, and the first glass pipe including a first portion connected to the first end of the glass block to connect the first portion of the first glass pipe to the first end of the cladding material;

after the connecting, introducing a gas into the first hole through the first glass pipe and the second hole, and gas phase processing an inner surface of the first hole;

after the gas phase processing, inserting a core material from the second end of the cladding material into the first hole until a tip end of the core material abuts against the first glass block; and after the inserting, integrating the cladding material and the core material by heating.

REFERENCE SIGNS LIST

1 . . . Optical fiber preform
2 . . . Core portion
3 . . . Cladding portion
10 . . . First glass pipe
11 . . . First portion
12 . . . Second portion
13 . . . First glass block
**13*a*** . . . First end
**13*b*** . . . Second end
14 . . . Hole
20 . . . Second glass pipe
30 . . . Cladding material
**30*a*** . . . First end
**30*b*** . . . Second end
31 . . . Hole
40 . . . Core material
**40*a*** . . . Tip end
**40*b*** . . . Rear end
41 . . . Main body part
42 . . . Dummy part
43 . . . First portion
44 . . . Second portion
50 . . . Second glass block
51 . . . Groove part
60 . . . Glass jig
61 . . . Hole
62 . . . Glass rod
**62*a*** . . . Tip end
**62*b*** . . . Rear end
63 . . . Joint
70 . . . Tearing part
71 . . . Glass rod

What is claimed is:

1. An optical fiber preform production method performed using a cladding material having a first end and a second end and being provided with a first hole, a first glass block having a first end and a second end and being provided with a second hole, and a first glass pipe including a first portion having one end connected to the first end of the first glass block, the method comprising:

connecting another end of the first portion of the first glass pipe to the first end of the cladding material;

after the connecting, introducing a gas into the first hole through the first glass pipe and the second hole, and gas phase processing an inner surface of the first hole;

after the gas phase processing, inserting a core material from the second end of the cladding material into the first hole until a tip end of the core material abuts against the first glass block; and after the inserting, integrating the cladding material and the core material by heating.

2. The optical fiber preform production method according to claim 1, wherein the first glass pipe further includes a second portion connected to the second end of the first glass block.

3. The optical fiber preform production method according to claim 2, wherein the cladding material is provided with a plurality of the first holes.

4. The optical fiber preform production method according to claim 2, wherein the core material includes a main body part to be inserted into the first hole and a dummy part connected to the main body part, and to be inserted into the first portion of the first glass pipe.

5. The optical fiber preform production method according to claim 1, wherein in the connecting, the first glass pipe is connected such that at least a portion of the first hole does not overlap the second hole when viewed in an axial direction of the cladding material.

6. The optical fiber preform production method according to claim 5, wherein a hole size of the first hole is greater than a hole size of the second hole.

7. The optical fiber preform production method according to claim 1, further including:

before the gas phase processing, connecting a second glass pipe to a second end of the cladding material; and after the inserting and before the integrating, inserting a second glass block inside the second glass pipe, and fixing the second glass block to a position abutting against a rear end of the core material.

8. The optical fiber preform production method according to claim 7, wherein the fixing is performed using a tubular glass jig disposed inside the second glass pipe and provided with a third hole, and a glass rod inserted through the third hole.

* * * * *